United States Patent [19]

Migeon

[11] 4,340,560
[45] Jul. 20, 1982

[54] METHOD FOR MAKING A ROTOR ASSEMBLY

[75] Inventor: Jean P. Migeon, Audeux, France

[73] Assignee: Timex Corporation, Waterbury, Conn.

[21] Appl. No.: 288,970

[22] Filed: Jul. 31, 1981

Related U.S. Application Data

[62] Division of Ser. No. 109,594, Jan. 4, 1980, abandoned.

[51] Int. Cl.³ .......................... B29D 3/00; B29C 17/00
[52] U.S. Cl. ....................................... 264/249; 29/598; 264/320
[58] Field of Search .......................... 29/512, 517, 598; 310/42, 43, 268; 264/249, 320, 322

[56] References Cited

U.S. PATENT DOCUMENTS

| | | | |
|---|---|---|---|
| 2,488,729 | 11/1949 | Kooyman | 310/156 |
| 2,756,495 | 7/1956 | Lathrop | 29/512 |
| 3,189,672 | 6/1965 | Lyman | 29/517 |
| 3,303,255 | 2/1967 | Bracey | 264/249 |
| 3,414,965 | 12/1968 | Stau et al. | 29/517 |
| 3,628,239 | 12/1971 | Hunt | 310/42 |
| 3,728,786 | 4/1973 | Lucas et al. | 29/598 |
| 3,943,698 | 3/1976 | Ono | 58/23 D |
| 3,953,752 | 3/1973 | Bannon | 310/156 |
| 4,095,129 | 6/1978 | Tanai et al. | 310/49 R |
| 4,206,379 | 6/1980 | Onda | 310/156 |

FOREIGN PATENT DOCUMENTS 1166907  11/1958  France .................................. 310/43

*Primary Examiner*—Willard E. Hoag
*Attorney, Agent, or Firm*—William C. Crutcher; Joseph A. Biela

[57] ABSTRACT

Method for making a rotor assembly for a stepping motor is provided by locating one flat side of a brittle magnetic rotor annulus against a preformed annular alignment surface molded into a thermoplastic hub and then thermoplastically working localized portions of the hub adjacent the other flat side of the rotor to form in situ a second annular shoulder thereagainst to lock the rotor in the aligned position. Other localized portions of the hub are thermoplastically worked to form in situ an inner circumferential lip extending radially from the hub into a corresponding groove in the shaft supporting the hub, thereby preventing axial movement of the hub and rotor mounted thereon. Required alignment of the brittle rotor disc is thereby achieved while minimizing the danger of breakage and also minimizing the number of components and assembly steps.

4 Claims, 3 Drawing Figures

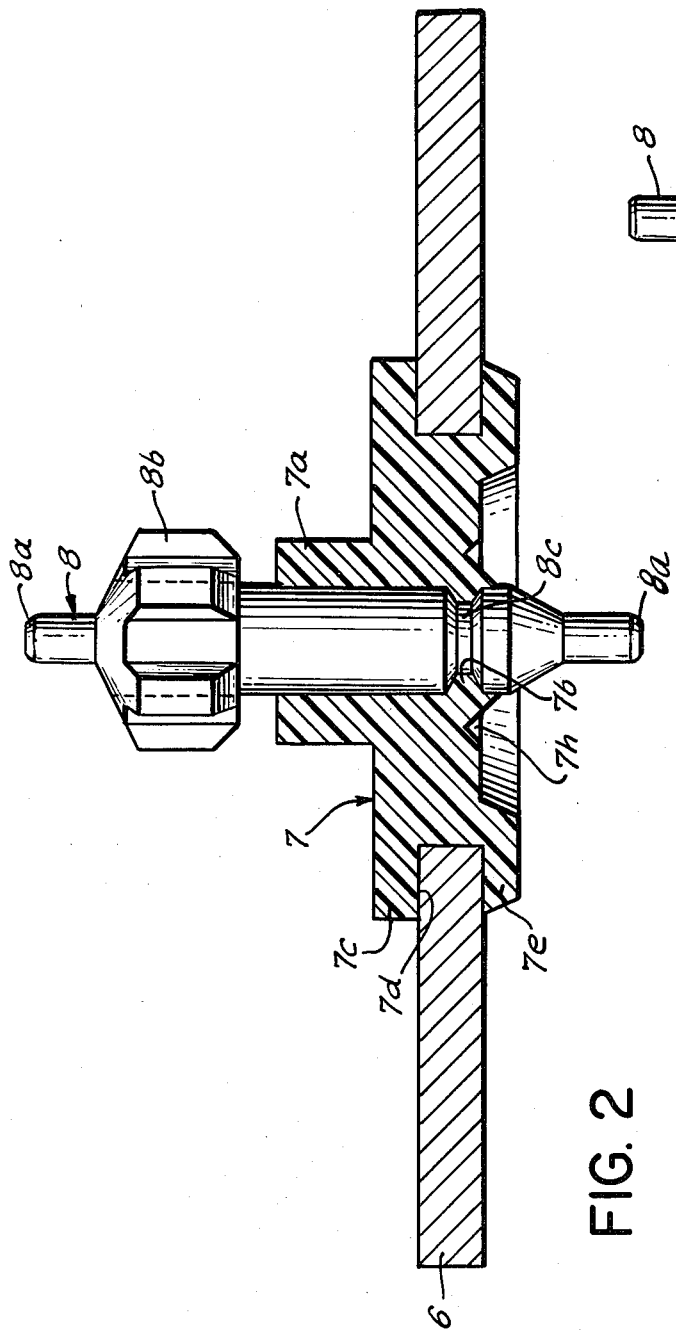
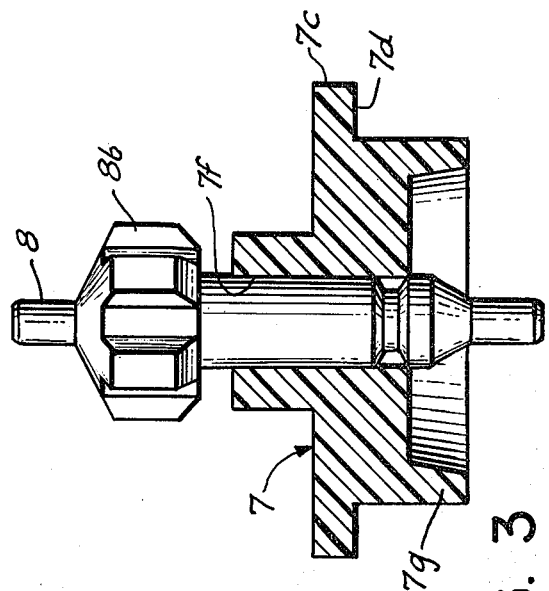
FIG. 2
FIG. 3

METHOD FOR MAKING A ROTOR ASSEMBLY

This is a division of application Ser. No. 109,594, filed Jan. 4, 1980, now abandoned.

FIELD OF THE INVENTION

This invention relates to an improved rotor assembly for an electric stepping motor and to an improved method for manufacturing the rotor assembly.

DESCRIPTION OF THE PRIOR ART

Electric stepping motors are known which are driven by pulses from a transistorized circuit or other known equivalent circuits. The stepping motor generally includes a main magnetic circuit formed of a stator and a rotor with a coil magnetically coupled to the stator via one or more core members in the form of simple rectilinear or U-shaped steel or iron plates extending through the coil to the stators, for example, typical stepping motor constructions are illustrated in the Oudet U.S. Pat. No. 3,754,155 issued Aug. 21, 1973; the Schwarzchild U.S. Pat. No. 3,818,690 issued June 25, 1974; the Schwab et. al. U.S. Pat. No. 3,860,842 issued Jan. 14, 1975; the Kuwako et. al. U.S. Pat. No. 3,984,709 issued Oct. 5, 1976; the Kikuyama et. al. U.S. Pat. No. 3,989,967 issued Nov. 2, 1976; and the Oudet et. al U.S. Pat. No. 4,079,279 issued Mar. 14, 1978.

The last mentioned Oudet et. al. (U.S. Pat. No. 4,079,279) discloses a stepping motor which employs a hard, brittle magnetic rotor disc, for example, made of a rear earth alloy. In fabricating a rotor assembly from such hard, brittle materials, prior art workers have experienced breakage problems and overall difficulty in handling such discs especially while attempting to precisely align and attach the rotor disc to a shaft that includes a pinion for driving the gear train of a timepiece. One scheme developed by prior art workers involves a rotor disc in the form of an annulus with a brass ring cemented in the center hole to provide stability for a molded plastic hub. The plastic hub includes an upper pinion section, an intermediate cylindrical hub section onto which the magnetic annulus with brass disc cemented thereto is press fit and a lower cylindrical section of slightly larger diameter for supporting the rotor disc. A steel shaft is press fit into the plastic part to provide an axis for rotation. The rotor assembly is completed by press fitting a brass bushing on the shaft adjacent the pinion section of the hub to prevent axial movement of the plastic part on the shaft. It is apparent that this type of rotor assembly requires numerous components and assembly steps which add to its cost.

SUMMARY OF THE INVENTION

Accordingly, an object of the present invention is to provide an improved rotor assembly for a stepping motor and process for making the assembly which provide accurate alignment of the rotor while at the same time minimize the danger of breakage of the brittle rotor.

Another object of the invention is to provide such an improved rotor assembly and process which use a minimum number of components and assembly steps.

In a typical embodiment of the invention, the rotor assembly includes a central shaft having a pinion near one end and a circumferential groove intermediate the shaft ends, a hub of thermoplastic material mounted on the intermediate portion of the shaft and an annular rotor disc made of brittle magnetic material and supported on the thermoplastic hub. An important feature of the rotor assembly is that the thermoplastic hub includes a first preformed annular shoulder projecting radially therefrom and against which one flat side of the annular rotor disc is located to insure proper alignment and positioning thereof and a second annular, radially projecting shoulder thermoplastically formed in situ against the other flat side of the annular rotor to secure it in the aligned position. Further, the hub is secured against unwanted axial movement on the shaft by having an inner circumferential lip thermoplastically formed in situ into the circumferential groove of the shaft.

A typical assembly process according to the invention involves mounting the thermoplastic hub on the central shaft, positioning the brittle annular rotor disc with one flat side against the first preformed annular shoulder of the hub for alignment purposes and then thermoplastically working localized portions of the hub adjacent the other flat rotor side, for example, with a heated tool, to form the second annular, radially-projecting shoulder in situ thereagainst for fixing the rotor position and, preferably, simultaneously thermoplastically forming the hub circumferential lip in situ into the corresponding groove of the shaft. It is important that the thermoplastic working be confined to selected localized areas of the hub to avoid distorting the first preformed alignment shoulder of the hub.

DESCRIPTION OF THE DRAWINGS

FIG. 2 is a partial cross-sectional view of the rotor assembly of the invention.

FIG. 3 is a partial cross-sectional view of the rotor assembly prior to thermoplastic working of the hub.

DESCRIPTION OF PREFERRED EMBODIMENTS

Figure 1:
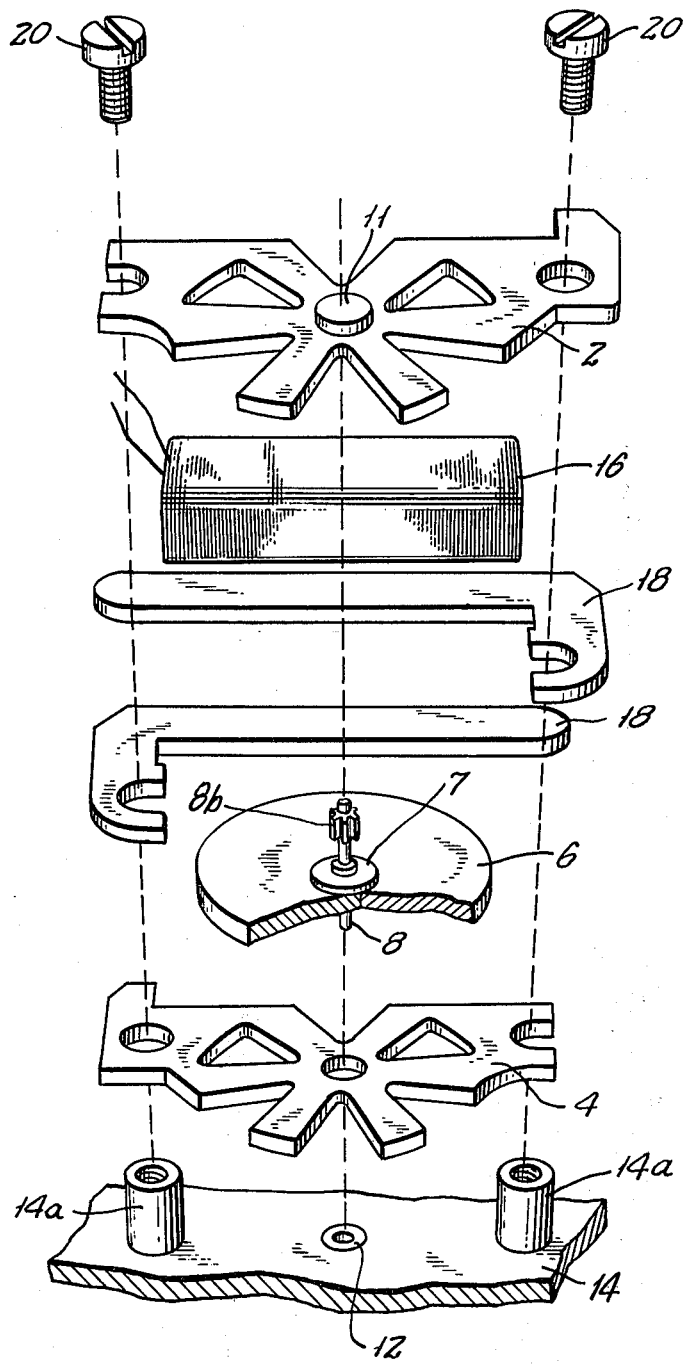
FIG. 1 is an exploded view of the components of a stepping motor.

FIG. 1 illustrates a stepping motor construction to which the present invention is applicable. Briefly, the stepping motor comprises an upper stator 2 and lower stator 4, both of magnetically permeable material, and a rotor 6 in the form of an annular disc of brittle magnetic material having a high coercive field, e.g. a rare earth alloy. The rotor 6 is supported on a hub 7 on central shaft 8 for rotation in the gap between the upper and lower stators. The central shaft in turn is supported at opposite ends by upper bearing 11 in the upper stator and lower bearing 12 in movement frame 14. A wound coil 16 which receives energizing current, for instance pulses of constant sign, is magnetically coupled to the upper and lower stators through L-shaped core members 18. The stepping motor is mounted on the movement frame 14 within a suitable housing (not shown) by means of support posts 14a and screws 20.

The stepping motor is preferably of the type illustrated in U.S. Pat. No. 4,079,279 issued Mar. 14, 1978 to Oudet et. al. which is incorporated herein by reference.

FIG. 2 shows the rotor assembly of the present invention as comprising the central shaft 8 having burnished ends 8a for mounting and rotation in upper and lower bearings 11 and 12. Near the top of the shaft is a pinion 8b which drives the gear train of a timepiece, e.g. as shown in a copending patent application entitled "Gear Train For Timepiece With A Stepping Motor" filed in the name of Paul Wuthrich as inventor and of common assignee herewith, the teachings of which are incorporated herein by reference. Below the pinion 8b on an intermediate portion of the shaft is a circumferential groove 8c.

A hub 7 made of thermoplastic material is secured on the intermediate shaft by initially press fitting cylindrical portion 7a on the shaft and thereafter thermoplastically forming circumferential lip 7b radially into the groove 8c of the shaft. Lip 7b locks the hub on the shaft, preventing axial movement of the hub relative to the shaft. The hub 7 further includes a first preformed annular shoulder 7c projecting radially therefrom and against which one flat side of annular rotor disc 6 is positioned. First shoulder 7c is preformed to high tolerances to provide annular alignment surface 7d to insure proper alignment of the rotor disc on the shaft and between the upper and lower stators of the motor. Importantly, a second annular shoulder 7e is thermoplastically formed in situ against the other flat side of the rotor disc 6 to secure it in place against alignment shoulder 7c.

The rotor disc 6, which is made of a brittle magnetic material such as a rare earth alloy, is thus properly positioned and aligned on the central shaft and between the upper and lower stators 2 and 4 after assembly of the shaft in the bearings. It is apparent that the rotor assembly is of simple construction and employs only three components.

A preferred process for manufacturing the rotor assembly involves initially press fitting the molded thermoplastic hub of FIG. 3 onto the intermediate cylindrical portion of shaft 8. To this end, the molded hub includes a central cylindrical bore 7f extending therethrough and of such size for effecting the press fit engagement on the shaft. The molded hub also includes the aforementioned preformed annular shoulder 7c projecting radially therefrom and also a preformed annular shoulder 7g projecting axially from the bottom end thereof. Of course, the outer diameter of the lower annular shoulder 7g and the intermediate portion of the hub between the shoulder 7g and 7c is selected to correspond generally to the inner diameter of annular rotor disc 6. Thus, the rotor disc can be inserted onto the hub with one flat side located against annular alignment surface 7d of preformed shoulder 7c. After the rotor disc is in proper position, the hub is thermoplastically worked at selected localized areas near the bottom end adjacent the other flat side of the rotor disc to form in situ shoulder 7e and inner circumferential lip 7b as appear in FIG. 2. In particular, a heated tool is brought to bear against the axial projecting shoulder 7g and the end of the hub surrounded thereby. As is apparent, shoulder 7g is transfromed from a axially-projecting annular shoulder into a generally radially projecting shoulder 7e against the lower flat side of the rotor disc. Simultaneously, an annular ring of hub material is pressed into the circumferential groove 8c of the shaft to form the lip 7b which prevents axial movement of the hub, leaving an annular trough 7h on the bottom of the hub. It is critical to the success of the present invention that only localized thermoplastic deformation of selected hub areas near the bottom end occur, for otherwise performed shoulder 7c and associated alignment surface 7d could be distorted and result in an improperly oriented rotor disc. Consequently, it is important to restrict such deformation to the hub features described above. This selective thermoplastic deformation is achieved and controlled by using a heated tool, an ultrasonic head or other known devices suitably configured and dimensioned to produce only the required movement of hub material. Those skilled in the art will appreciate that such tooling can be readily designed by those familar with techniques for thermoplastically forming materials.

Of course, it is important to the invention that the hub 7 be made of a thermoplastic material having sufficient strength to support the rotor disc. I have found that polyphenylene sulfide resin possesses the required properties and can be readily molded into the hub configuration of FIG. 3 and thereafter locally thermoplastically formed into the finished hub configuration of FIG. 2, all within required tolerances for the stepping motor application.

While there have been described what are herein considered to be the preferred embodiments of the invention, other modifications will occur to those skilled in the art, and it is desired to cover in the appended claims all other modifications as fall within the true spirit and scope of the invention.

I claim:

1. A method for making a rotor assembly for a stepping motor, comprising:
   (a) mounting a hub of molded thermoplastic material onto a shaft having a circumferential groove intermediate the shaft ends, said hub having a generally cylindrical body with one end including a first preformed annular shoulder extending radially outward to provide an alignment surface for rotor location and the other end disposed around the groove in said shaft,
   (b) disposing an annular rotor disc having oppositely facing flat sides onto the cylindrical body of the hub with one flat side thereof abutted against the alignment surface of the preformed annular shoulder to effect proper alignment of the rotor disc on the shaft, and
   (c) working with heat and pressure outer and inner portions of said other hub end adjacent the other flat side of the mounted rotor disc to form in situ a second annular shoulder extending radially outward and spaced from the first preformed annular shoulder to clamp the rotor disc therebetween against said alignment surface, and to form in situ a circumferential lip extending radially inward into the circumferential groove on the shaft to thereby prevent axial movement of the hub on the shaft, said working being localized at said other end adjacent the other flat side of the rotor disc so as not to distort the preformed annular shoulder and associated alignment surface of the hub.

2. The method of claim 1 wherein the molded hub initially includes a preformed annular shoulder extending axially from said other end and over which the annular rotor disc is passed so that said axially-extending shoulder is disposed on said other flat side of the rotor disc after said disc is aligned, said axially-projecting shoulder being thereafter with heat and pressure worked to form in situ the second radially-extending shoulder which clamps the rotor disc against the alignment surface.

3. The method of claim 1 wherein the second radially-extending annular shoulder and the circumferential lip are formed with heat and pressure in situ in one step.

4. The method of claim 3 wherein said second annular shoulder and circumferential lip are formed in one step by pressing localized areas of said other hub end adjacent said other flat side of the rotor disc with a suitably configured tool.

* * * * *